May 17, 1966  H. J. AMUNDSEN, JR  3,252,135
PRESSURE MONITORING APPARATUS
Filed Aug. 19, 1963

HYRUM J. AMUNDSEN, JR.
INVENTOR

Huebner & Worrel
ATTORNEYS

United States Patent Office 3,252,135
Patented May 17, 1966

3,252,135
PRESSURE MONITORING APPARATUS
Hyrum J. Amundsen, Jr., 2809 4th St.,
Bakersfield, Calif.
Filed Aug. 19, 1963, Ser. No. 303,096
3 Claims. (Cl. 340—58)

The present invention relates to pressure monitoring apparatus adapted to detect pressure variations within a confining member and to indicate at a point remote from the member the condition of pressure existing in such member.

While the invention has particular utility in connection with the conditions of inflation of automotive tires and the registration of such condition at positions convenient for visual reference, the invention is also equally well suited for use in other operational environments requiring a monitoring and registering of pressure within a confining member.

The importance of proper pressures existing within certain confining members, such as automotive tires, is quite generally recognized and various types of monitoring apparatus have been previously devised to respond to pressure variations therein. Many of such previously known devices are not readily adaptable to confining members which are intermittently motivated, such as automotive tires. Since the rate of movement of such tires varies throughout a wide range and a great variety of environmental conditions must be endured by any monitoring apparatus used in conjunction therewith, such apparatus must be capable of withstanding forces imposed incident to such movement and must also be dependable in operation throughout an extensive range of climatic and other environmental conditions.

While satisfying certain of the above criteria, many of such previously known devices have been found to be difficult to install, to require special adapters, and also to preclude ready servicing of the tires. Certain of such devices permit unwarranted adjustment or other tampering following installation on a tire. Others are constructed of a multiplicity of parts unnecessarily added to the rotating mass of the tire and supporting wheel. Consequently, the suitability and dependability of such previously known pressure monitoring devices for use on high speed automotive vehicles, particularly heavy duty vehicles, such as highway transport trucks and trailers, have been considerably less than desired.

Accordingly, it is an object of the present invention to provide an improved pressure monitoring apparatus.

Another object is to provide such a pressure monitoring apparatus which is readily adaptable to pressure confining members, such as tires used on heavy duty, high speed automotive vehicles.

Another object is to provide a pressure monitoring apparatus of dependable reliability and integrity.

Another object is to provide an improved pressure monitoring apparatus which is easily installed on pressure confining members in pressure detecting relationship and is particularly well suited for use on contemporary automotive tires.

Another object is to provide such an apparatus which permits normal servicing of the tire on which it is mounted, including rapid inflation and deflation thereof.

Another object is to provide a pressure monitoring apparatus adaptable for use with tube and tubeless type vehicle tires and which includes a warning device to signal the loss of pressure in one or more of the several tires of a vehicle.

These, together with other objects, will become more fully apparent upon reference to the following description and accompanying drawing.

Figure 1:
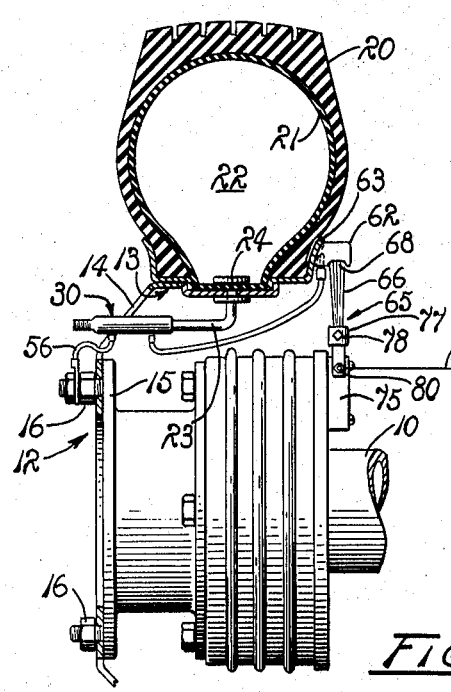
FIG. 1 is a partial vertical section taken through a wheel and associated structure of an automotive vehicle and having a tire mounted thereon including an inner tube as a pressure confining member and showing pressure monitoring apparatus embodying the principles of the present invention, portions of such apparatus being shown schematically.
Figure 2:
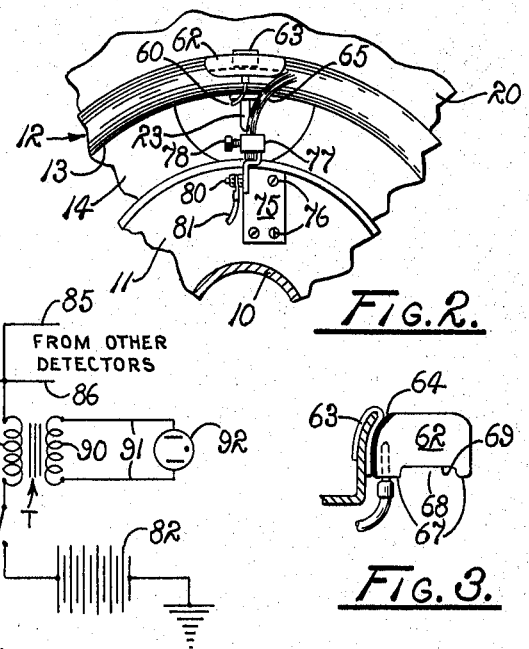
FIG. 2 is a fragmentary view in side elevation of the wheel and apparatus of FIG. 1.
Figure 3:
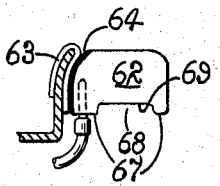
FIG. 3 is an enlarged fragmentary view of a contactor block forming a part of the apparatus of FIG. 1.

Referring more particularly to FIG. 1 of the drawing, an axle housing 10 is fragmentarily illustrated, it being understood that it forms a part of a contemporary automotive vehicle, not shown, such as a heavy duty, highway truck or trailer for which the pressure monitoring apparatus of the present invention is well suited. A driving axle, not shown, is rotatably mounted in the housing 10 and driven by the prime mover of the vehicle through suitable power transmission means, also not shown. A backing plate 11 is fragmentarily illustrated in FIG. 2, and serves as a support for conventional brake shoes mounted thereon but not shown. A wheel, generally indicated at 12, is rotatably supported by the housing 10 and operatively connected with the axle in driven relationship thereto. The wheel includes a rim 13 carried by a drop center annular portion 14 secured to a hub 15, as by conventional wheel bolts 16.

A conventional pneumatic tire 20 is mounted on the rim 13 and optionally contains an inner tube 21. The tire, in conjunction with the tube, constitutes a pressure confining member defining a pressure chamber 22. A tubular stem 23 provides pneumatic communication with the chamber 22 and includes a mounting base 24 secured to the tube. In the event a tubeless type of tire is employed, the base 24 is secured to the rim 13. The stem 23 is provided with an outer threaded end and an internal passageway 26 leading to the chamber 22. The stem is provided with internal threads 27 adapted to receive a conventional valve core which is removed from the stem when the present invention is employed as a pressure monitoring apparatus.

Figure 4:
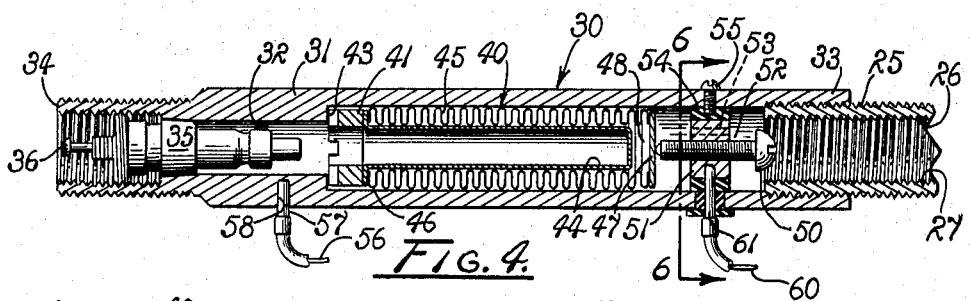
FIG. 4 is an enlarged fragmentary view in vertical, longitudinal section of a pressure detector employed in the apparatus of FIG. 1.
Figure 5:
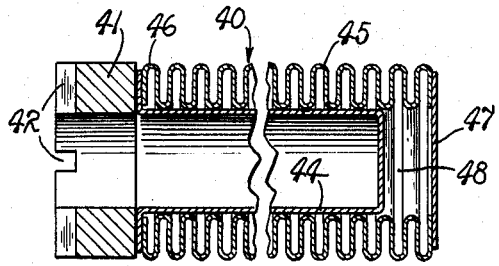
FIG. 5 is an enlarged fragmentary view in vertical, longitudinal section of a bellows incorporated in the detector of FIG. 4.
Figure 6:
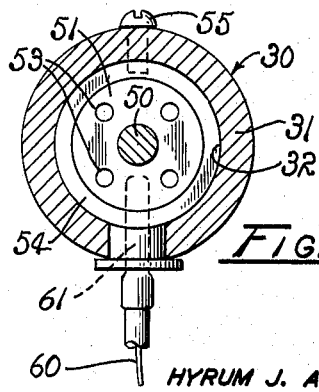
FIG. 6 is an enlarged view in vertical, transverse section taken on line 6—6 of FIG. 4.

A pressure detector 30 employed in the present invention is illustrated in FIG. 4 and includes a tubular wall member 31 formed of an electrically conducting material and provided with an axial passageway 32 leading from an internally threaded inner end 33 and an internally threaded outer end 34. The outer end is adapted to receive a conventional valve core 35 which includes a plunger 36 and is adapted to block the passageway 32 in flow controlled relationship thereto. The outer end 34 is also provided with external threads to support a conventional valve cap, not shown.

A pressure responsive bellows 40 is mounted on an annular base 41 provided with one or more radial slots 42 in communication with the axial passageway 32. The base 41 is rigidly mounted on an annular shoulder 43 provided in the tubular member 31. The bellows includes an internal longitudinally rigid shell 44 secured to the base 41 and a flexible longitudinally corrugated wall 45. The wall 45 is formed of electrically conducting material, such as copper or suitable alloys thereof, and is provided with a mounting end 46 rigidly secured to the shell 44 adjacent to the base 41 in sealing relationship therewith. The opposite end of the corrugated wall 45 is closed by a sealing disc 47 of electrically conducting material which serves as a first electrical contact in the present apparatus. The wall 45 in conjunction with the inner shell 44 and the sealing disc 47 forms a closed chamber 48 containing a predetermined volume of compressible fluid, such as air, at a predetermined pressure compatible with the resiliency characteristics of the wall 45. Accordingly, a predetermined pressure existing within the axial pasageway 32 effects longitudinal compression of the bellows 40, and the inherent characteristics of the wall member 45, in conjunction with the pressure existing in chamber 48, effects a longitudinal expansion of the bellows 40 upon the pressure falling below a predetermined value in the passageway 32. The maximum diameter of the base 41 and the wall 45 is sufficiently smaller than the internal diameter of the chamber 48 that air can pass the bellows to inflate and to deflate the tire 20.

A second electrical contact in the form of an adjustable screw 50 is mounted internally of the detector 30 by means of a support disc 51 provided with a suitable threaded receiving bore. The screw 50 is adjustable longitudinally relative to the disc 47 so that contact therewith is made at a predetermined pressure value within the passageway 32. The screw 50 is maintained in a predetermined adjusted position by means of a suitable adhesive, such as an epoxy resin 52 in contact with the screw 50 and the disc 51.

The support disc 51 is provided with a plurality of apertures 53 permitting passage of fluid therethrough and maintaining fluid communication between the detector 30 and the valve stem 23. The disc 51 is mounted in an annular bushing 54 of dielectric material and maintained in a predetermined axial position within the tubular member 31 by means of a retaining screw 55 mounted therein.

A conductor 56 is connected at one end to the ground, as by one of the wheel bolts 16, and is connected at its opposite end to the detector 30 by means of a pin 57 releasably frictionally received in a socket 58 provided therein. In like manner, the screw 50 is provided with an electrical conductor 60 having a pin 61 frictionally received in a suitable socket provided in the disc 51. By means of the conductor 60, the screw 50 is in electrical series circuit with a contactor block 62. The block is mounted on the rim 13 by a clip 63, but insulated therefrom by suitable dielectric material, such as the mounting pad 64. A stationary brush 65 is formed from a plurality of individual electrically conducting wire bristles 66 and in a configuration and dimension to be received between laterally opposed guide flanges 67 provided on the contactor block 62. The flanges 67 define therebetween a receiving channel 68 provided with a contact surface 69. Upon rotation of the wheel and consequent circular movement of the contactor block 62, intermittent electrical contact between the surface 69 and the brush 65 is effected. The flanges 67 are spaced at a predetermined distance and the channel 68 is of a configuration thereby to maintain a desired configuration of the bristles 68 and to urge them inwardly toward each other during rotation of the wheel.

The brush 65 is mounted on the backing plate 11 by means of an insulating bracket 75 secured to the plate 11 by screws 76. A brush support 77 is rigidly secured to the bracket 75 and includes a clamping screw 78 adapted to hold the brush 65 in the desired position for contact by the block 62 incident to rotation of the wheel 12. A binding post 80 extends from the brush support 77 and is connected by a conductor 81 to a source of electrical energy, such as a battery 82. The conductor 81 preferably is connected to a primary winding 83 of the transformer and leads to a master switch 84 permitting selective disconnection from the battery 82. Branch conductors fragmentarily illustrated at 85 and 86 lead from other detectors, such as the one illustrated at 30, which are respectively mounted on other tires of the vehicle, not shown. The transformer includes a secondary winding 90 connected by suitable conductors 91 to a neon lamp 92, which is a form of suitable ionizable gas discharge lamp disposed for ready visual reference by the vehicle operator and serves as a registering means indicating a predetermined pressure within the tire 20.

*Operation*

The operation of the described embodiment of the subject invention is believed to be readily apparent and is briefly summarized at this point. The electrical components of the pressure monitoring apparatus are readily installed on the vehicle, such as the contactor block 62 by the clip 63, which is in the form of a conventional mounting clip used for contemporary wheel-balancing weights. The insulating mounting block 75 is secured to the brake backing plate 11 for support of the brush 65 at a position to be contacted by the block 62 incident to rotation of the wheel 12.

Prior to mounting of the detector 30 on the valve stem 23, the valve core, such as core 35, normally mounted internally of the stem 23, is first removed. The core 35 is then positioned internally of the detector 30 as by the internal threads of the outer end 34 in flow controlling relationship to the passageway 32. The detector then is ready for installation on the valve stem 23 by joining the internally threaded end 33 to the outer end 25 of the valve stem. Consequently, the passageway 32 is in pneumatic communication with the chamber 22 of the tire 20.

The screw 50 is adjusted prior to installation on the valve stem 23 so that the disc 47 contacts the screw 50 at a predetermined pressure value within the passageway 32. The epoxy resin 52 is also disposed about the threads of the screw 50 in contact with the disc 51 so as to maintain the predetermined adjustment and prevent unwarranted movement of the screw following initial adjustment. Suitable identifying indicia is then stamped on the external surface of the tubular member 31 as a means of identifying the pressure value to which the screw 50 has been adjusted.

Following mounting of the detector 30 on the valve stem 23, the connecting pins of the electrical conductors 56 and 60 are inserted in their receiving sockets. The outer end 34 of the detector 30 is connected to a suitable source of air at a satisfactory pressure to inflate the tire 20 to a predetermined value. Consequently, the bellows 40 is contracted longitudinally incident to the pressure existing within the chamber 22 and passageway 32 so that the disc 47 is moved axially from the screw 50.

With the master switch 84 closed, rotation of the wheel 12 does not cause illumination of the neon lamp 92, so long as pressure within chamber 22 is maintained at or above a predetermined level and the bellows 40 remains axially contracted. Assuming that the pressure within the tire 20 falls below such a predetermined value, either by reason of a small, undetected, leak at a low rate or by a sudden deflation, the bellows 40 moves the disc 47 into contact with the screw 50 thereby completing the electrical circuit between the contactor block 62 and the grounded side of the battery 82. Continued rotation of the wheel 12 effects an intermittent contact between the block 62 and the brush 65 to complete the electrical circuit through the primary winding 83. The pulses of low voltage electrical energy are stepped up through the secondary winding 90 to a sufficient voltage, such as 115 volts, as discrete pulses of alternating current impressed upon the conductors 91 sufficient to illuminate the neon lamp 92.

Assuming that the conductors 85 and 86 are connected to other detectors, such as 30, the lamp 92 serves to register the decrease of pressure in any one of the several tires of a vehicle. Since the detectors are all connected in parallel, it is then necessary to make a visual inspection of each tire to determine which has experienced a loss in pressure. Being warned of the existence of the problem condition, an operator of the vehicle can readily make such inspection.

Accordingly, the present invention provides pressure monitoring apparatus which is readily adaptable to contemporary automotive tires and permits servicing of the tires without removal of the detector 30. The pressure detectors are pre-set at the place of manufacture for a predetermined pressure value and dependably sealed so as to preclude unauthorized maladjustment following delivery. During operation, the apparatus in no way interferes with the electrical system of contemporary automotive vehicles nor does it utilize electrical energy except when registering a loss of pressure in one of the tires. The apparatus is of rigid metal construction, which serves as an excellent electrical conductor, and of low weight so as not unnecessarily to add to the rotating mass of the vehicle wheels to cause an imbalance thereof, or require extensive counterweighting. The movable pressure responsive means supporting one of the electrical contacts is disposed in a protected position and is at all times in pneumatic communication with the tire on which it is mounted. Accordingly, the apparatus has been found to be fully reliable in operation and to have a high degree of reporting integrity.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a vehicle including a wheel rotatably mounted thereon in supporting relationship thereto, a pneumatic tire mounted on the wheel and affording a pressure confining chamber therein, and a valve stem extended from the tire and providing a pneumatic passageway therethrough, the apparatus comprising pressure detecting means including a tubular wall member of electrical conducting material and affording an axial passageway therethrough; means mounting the detector at one end on the valve stem in pneumatic communication therewith; valve means mounted at the opposite end of said detector in flow-control relationship to said passageway; a first electrical contact; a pressure responsive bellows mounted in the tubular wall member in pneumatic communication with said passageway and supporting said first contact, said bellows being electrically conductive and secured to said wall member in conducting relation; a second electrical contact; dielectric means mounting said second contact adjacent to said first contact; the second contact being adjustably mounted within said dielectric for adjustable positioning in relation to the bellows, the bellows being adapted to move the first contact to and from engagement with the second contact incident to pressure changes within said tire; a source of electrical energy; registering means energizable by said electrical source; and circuit means connecting said electrical source and said registering means in controlled relationship with said contacts.

2. In a vehicle including a wheel rotatably mounted thereon in supporting relationship thereto, a pneumatic tire mounted on the wheel and affording a pressure confining chamber therein, and a valve stem extended from the tire and providing a pneumatic passageway therethrough, the apparatus comprising pressure detecting means including a tubular wall member of electrical conducting material and affording an axial passageway therethrough; means mounting the detector at one end on the valve stem in pneumatic communication therewith; valve means mounted at the opposite end of said detector in flow-control relationship to said passageway; a first electrical contact; a pressure responsive bellows mounted in the tubular wall member in pneumatic communication with said passageway and supporting said first contact, said bellows being electrically conductive and secured to said wall member in conducting relation; a second electrical contact; dielectric means mounted in the pneumatic passageway at the end remote from the valve; the second contact being adjustably mounted within said dielectric means in adjustably spaced relation to the bellows, the bellows being adapted to move the first contact to engage and disengage the second contacts incident to pressure changes within said tire; a source of electrical energy; registering means energizable by said electrical source; and circuit means connecting said electrical source and said registering means in controlled relationship with said contacts.

3. A pressure sensing device comprising a tubular member of electrical conductive material having an end adapted for mounting on a valve stem of a tire and an opposite end, said member providing an internal shoulder disposed toward its mounting end; a valve mounted in said opposite end of the tubular member adapted to admit air but to block release of air; an elongated bellows positioned in the tubular member against the internal shoulder thereof and extended toward said mounting end, the tubular member defining an air passage past the bellows; a perforated support of dielectric material mounted in the tubular member adjacent to the extended end of the bellows; a contact mounted on the extended end of the bellows in electrical communication with the tubular member; and a contact mounted on the support engageable with the contact on the bellows incident to expansion of the bellows.

References Cited by the Examiner

UNITED STATES PATENTS

| | | | |
|---|---|---|---|
| 1,975,639 | 10/1934 | Greene | 200—61.25 |
| 2,554,594 | 5/1951 | Shea | 340—58 |
| 2,756,297 | 7/1956 | Lichtenfeld | 200—61.22 |

NEIL C. READ, *Primary Examiner.*

A. H. WARING, *Assistant Examiner.*